United States Patent [19]

Mastny

[11] Patent Number: 5,495,106

[45] Date of Patent: Feb. 27, 1996

[54] DETECTION OF SUBSURFACE FISSIONABLE NUCLEAR CONTAMINATION THROUGH THE APPLICATION OF PHOTONUCLEAR TECHNIQUES

[75] Inventor: Gary F. Mastny, San Diego, Calif.

[73] Assignee: The United States of America as represented by the Secretary of the Navy, Washington, D.C.

[21] Appl. No.: 320,612

[22] Filed: Oct. 6, 1994

[51] Int. Cl.[6] .................................................. G01V 5/12
[52] U.S. Cl. ................ 250/253; 250/269.1; 250/390.01; 250/390.04
[58] Field of Search ........................... 250/253, 269.1, 250/390.01, 390.04, 256; 376/153, 157

[56] References Cited

U.S. PATENT DOCUMENTS

| | | | |
|---|---|---|---|
| 2,707,555 | 5/1955 | Gaudin | 376/157 |
| 2,726,338 | 12/1955 | Goodman | 376/157 |
| 2,952,775 | 9/1960 | Guinn | 376/157 X |
| 3,015,030 | 12/1961 | Jones | 250/269.1 X |
| 3,291,997 | 12/1966 | Albenesius et al. | 250/256 X |
| 3,293,434 | 12/1966 | Dexter et al. | 376/157 X |
| 4,251,726 | 2/1981 | Alvarez | 376/157 X |
| 5,057,268 | 10/1991 | Muller | 376/157 |

FOREIGN PATENT DOCUMENTS

| | | | |
|---|---|---|---|
| 444487 | 2/1977 | U.S.S.R. | 250/269.1 |
| 484787 | 2/1977 | U.S.S.R. | 250/269.1 |

OTHER PUBLICATIONS

Minac 4–6, "Portable High–Energy X–Ray Systems", brochure, Schonberg Radiation Corp., 1991.

*Primary Examiner*—Carolyn E. Fields
*Assistant Examiner*—Edward J. Glick
*Attorney, Agent, or Firm*—Harvey Fendelman; Thomas Glenn Keough; Eric James Whitesell

[57] ABSTRACT

A photoneutron detection apparatus comprises an X-ray generator and a neutron detector adapted for placement in proximity to subsurface soil. The X-ray generator produces timed pulses of X-ray photons having a range of electronically controlled energies which penetrate the subsurface soil to produce photoneutron emissions that are received by the neutron detector. The neutron detector generates a signal representative of the neutron flux. A signal analysis system time correlates the signal with the timed X-ray pulses to determine the presence of selected contaminants.

18 Claims, 2 Drawing Sheets

DETECTION OF SUBSURFACE FISSIONABLE NUCLEAR CONTAMINATION THROUGH THE APPLICATION OF PHOTONUCLEAR TECHNIQUES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to the field of in situ detection of subsurface contamination, and more particularly, to a system which detects subsurface fissionable nuclear contamination by means of photoneutron emissions and detection.

The purpose of this invention is to provide a cost effective means for in situ detection of fissionable materials such as uranium and plutonium which may be present as soil contaminants in the vicinity of nuclear material processing facilities. Previous methods for detecting such contamination require that samples be extracted and sent for laboratory analysis. This procedure involves delay and labor intensive handling. A far more desirable approach is to detect and quantify fissionable contamination in situ. Such an approach allows for the possibility of real time three dimensional mapping of the contaminants.

Passive detection of the natural radioactive emissions from fissionable materials is limited by the relatively low level of such emissions and the relatively high background level associated with natural terrestrial sources. An alternative approach is to selectively increase the radiation emission rate of the contaminants by active stimulation. An example of active stimulation of radiation emission is photonuclear stimulated neutron emission or photoneutron generation.

Photoneutrons are generated when an energetic photon interacts with a nucleus. If the energy of the photon exceeds the threshold binding energy of neutrons in the nucleus, a photoneutron can be liberated from the nucleus. The energy threshold for this process is dependent on the isotopic species of the nucleus with which the photon interacts. By observing the threshold at which photoneutron generation occurs it is possible to detect and distinguish the presence of specific elements. This technique is useful for fissionable contaminants such as uranium and plutonium, and also for other selected contaminants such as beryllium.

Photoneutron stimulation is not commonly used as an analytic technique because the photon energy required is very high. The photon energy threshold ranges from 1.665 MeV for beryllium to in excess of 7 MeV for many common metals and rare earth elements. The threshold energy range for fissionable nuclear contaminants is between approximately 3 to 7 MeV. Operation of sources which generate such energetic photons involves significant safety issues, and for laboratory analysis many alternative methods are available, including many techniques of chemical analysis and spectroscopy of alpha particle and gamma radiations.

For in situ analysis of soil contamination the laboratory techniques are not generally practical, since laboratory instruments are not designed to be operated inside holes drilled in the ground. Therefore, the current practice is to remove samples as noted above.

Therefore, there is a need for an apparatus and method for in situ analysis of fissionable nuclear contamination in subsurface soil.

SUMMARY OF THE INVENTION

In accordance with this inventive concept, the above noted problems of the prior art are overcome and there are provided an apparatus and method which employ the process of photoneutron emission to detect fissionable nuclear contamination in subsurface soil without removing samples for laboratory analysis.

In accordance with one aspect of the inventive concept, a subsurface photoneutron detection apparatus includes X-ray generating means and neutron detecting means which are adapted for placement in proximity to subsurface soil. The X-ray generating means provides pulses of X-ray photons of selected energies which penetrate surrounding subsurface soil to produce photoneutron emissions that are received by the neutron detecting means. Signals produced by the neutron detecting means are conveyed to a signal analysis system which determines the presence of selected contaminants in accordance with the relationship between the neutron detector signals and the energies of the X-ray photons.

In accordance with another aspect of the inventive concept, a method for detecting subsurface contaminants by photoneutron emission includes generating X-ray photons of selected energies at a location proximate to subsurface soil. Photoneutrons from contaminants in the subsurface soil are detected to produce signals representing neutron flux. The neutron flux signals are analyzed in relation to the X-ray photon energies to determine the presence of selected contaminants in the subsurface soil.

OBJECTS OF THE INVENTION

An object of the invention is to provide an apparatus for in situ detection of selected contaminants in subsurface soil.

Another object of the invention is to provide a method for in situ detection of selected contaminants in subsurface soil using the process of photoneutron emission.

These and other objects of the invention will become more readily apparent from the ensuing specification and claims when taken in conjunction with the appended drawings.

BRIEF DESCRIPTION OF THE DRAWINGS

Throughout the several figures, like elements are referred to with like reference characters.

DESCRIPTION OF THE PREFERRED EMBODIMENTS

Figure 1:
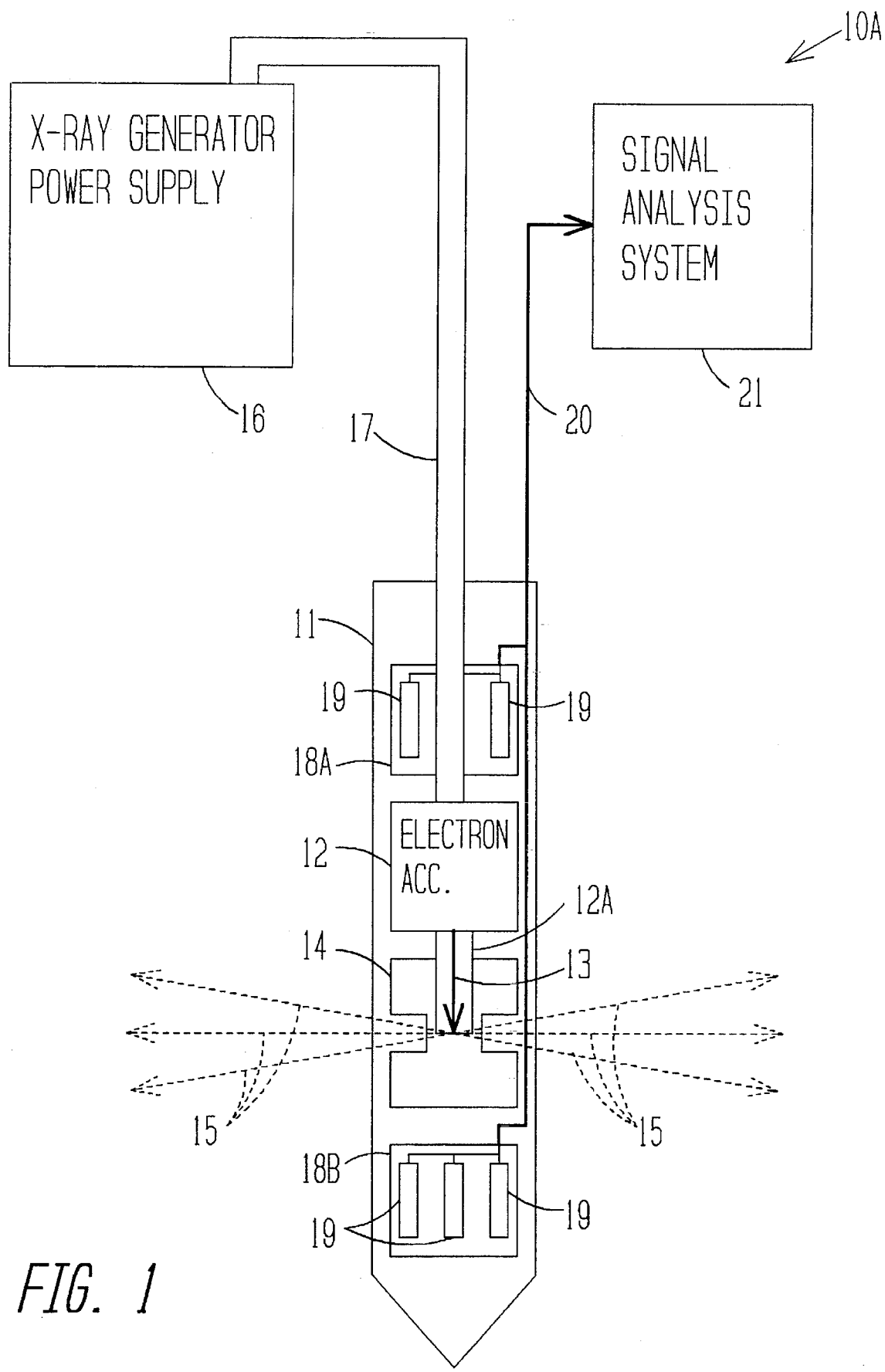
FIG. 1 illustrates a photoneutron detection system in accordance with a first embodiment the inventive concept.

Referring to FIG. 1 there is shown a schematic diagram of a photoneutron detection system 10A in accordance with a first embodiment of this inventive concept. A cylindrical housing 11 is shown in a cross-sectional view. Cylindrical housing 11 is designed so that the photoneutron detection system can be disposed in proximity to subsurface soil. For example, the housing may be designed or adapted so that it can be deployed by cables and other apparatus (not shown)

into a bore hole drilled into the ground. As another example, the cylindrical housing may be adapted and included as part of a system (not shown) which penetrates subsurface soil by application of vertical force. Methods for drilling bore holes and otherwise penetrating subsurface soil are well known, and such methods are generally included within the practice of the present invention. Suitable design of housings for apparatus to be deployed in subsurface systems is also well known to engineers skilled in the art.

An electron accelerator 12 provides pulses of high energy electrons 13. High energy electrons 13 travel through propagation tube 12A and impact on a target collimator 14 to produce X-ray photons 15 by the physical phenomenon referred to as Bremsstrahlung. The energy of the electrons is converted into X-rays by deceleration in the target, resulting in a Bremsstrahlung X-ray energy spectrum with a maximum energy less than the energy of the electrons. Power for electron accelerator 12 is provided by an X-ray generator power supply 16 and is conveyed to the electron accelerator via a supply line 17. Optionally, supply line 17 may include water cooling lines (not shown) as may be required by the X-ray generating components 12 and 14. Supply line 17 is designed to allow disposition of the photoneutron detection apparatus in proximity to subsurface soil by various methods as noted hereinabove. This involves providing sufficient length and properties of rigidity and/or flexibility as may be required. As noted above, design of equipment for introduction into bore holes is well understood by engineers skilled in the field.

Components 12, 14, and 16 are parts of an X-ray generating system. Suitable X-ray generating systems that can be adapted as described herein are manufactured by Schonberg Radiation Corporation of 3300 Keller Street, Suite 101, Santa Clara, Calif. 95054. An example is the Schonberg Radiation Corporation portable high energy X-ray system marketed under the designation Minac 6. The practice of the present inventive concept may also include use of other X-ray generating systems, providing that the systems can provide X-ray photons in an approximate energy range of 3 to 7 MeV, and also providing that the X-ray source can be adapted for disposition within a housing suitable for subsurface placement.

X-ray target collimator 14 is preferably cylindrical in shape, and is schematically shown in a cross-sectional view in FIG. 1. X-ray target-colimator 14 is designed so that X-ray photons 15 are allowed to propagate in all directions perpendicular to the axis of the cylindrical housing and with a divergence of about 30 degrees above and below the perpendicular plane. X-ray photons propagating in other directions are absorbed by target collimator 14. This allows the X-ray photons to penetrate soil around cylindrical housing 11 while limiting irradiation of other components. A target collimator which provides such a radiation pattern is commercially available as part of the Minac 6 X-ray system referred to above.

Also included in cylindrical housing 11 are neutron detector assemblies 18A and 18B. The neutron detector assemblies include a plurality of neutron detectors 19. Neutron detectors 19 preferably include detectors for both "fast neutrons" and for "slow neutrons", where fast neutrons are neutrons with energies greater than 0.0253 eV and slow neutrons have energies less than or equal to 0.0253 eV. This distinction is made because a detector suitable for detection of fast neutrons is generally ineffective for detecting slow neutrons. The inventive concept may be practiced using either class of detectors, but for best sensitivity use of both types of detectors is preferred. A variety of suitable neutron detectors are described in "Radiation Detection and Measurement" by Glenn F. Knoll, published by John Wiley & Sons, Inc., 1979.

The signals produced by neutron detectors 19 are conveyed via signal lines included in a signal cable 20 to a signal analysis system 21. Signal cable 20 also contains lines which convey bias voltages to the neutron detectors. Optional preamplifiers (not shown) may be included proximate to the neutron detectors to amplify and condition the detector signals for transmission to the detector signal analysis system. Signal analysis system 21 includes bias supplies, amplifiers, and bandpass filters as required for operation of the neutron detectors. The design and operation of neutron detectors and associated electronic systems is well known to persons skilled in the field of radiation detection and electronics. The signal analysis system also includes analog to digital converters and digital signal processing electronics such as a digital computer system. As an example, a personal computer system equipped with D/A boards, IEEE 488 control boards, programmable amplifiers and bias supplies may be included in the signal analysis system. The signal analysis system is adapted by well known methods to acquire the neutron detector signal data and perform analyses as further described below in order to determine the presence of selected contaminants in the subsurface soil irradiated by X-ray photons.

Principle of Operation

Operation of the invention will be described in reference to the detection of beryllium (Be), as an example. Although Be is not a fissionable isotope, it is associated with the production of nuclear devices, and the principle of operation for this inventive concept is the same for Be as for fissionable nuclear isotopes. It will be obvious to persons skilled in the art of nuclear science that the teachings herein can be generally applied for detection of other isotopic species.

As an example, the invention may operated according to the following procedures: First, the photoneutron detection apparatus is placed in a bore hole or otherwise disposed proximate to subsurface soil in a desired location.

Electron accelerator 12 is operated to provide brief pulses of high energy electrons. This is a capability of the Schonberg Minac 6 system referred to above. As explained below, the energy of the electrons is adjusted so that the maximum energy of the Bremsstrahlung generated X-ray photons is within a desired range of energies above and below the photoneutron threshold for Be of 1.665 MeV. Energy adjustment is accomplished by adjustment of X-ray generator power supply 16 in accordance with the manufacturer's operating instructions.

The pulses of X-ray photons cause the emission of pulses of photoneutrons from surrounding soil. Photoneutrons return to neutron detectors in a delayed pulse following an X-ray pulse. Typically, an X-ray pulse duration will be less than five microseconds. The delay in the return of the neutrons is due to the propagation velocity of the neutrons in conjunction with neutron scattering processes. A neutron pulse will occupy a period extending to about 100 milliseconds following the X-ray pulse. The brief duration of the X-ray pulses allows discrimination of the X-ray response in the neutron detectors, and the subsequent pulses of neutrons are discriminated relative to background radiation by virtue of being time correlated with the X-ray pulses.

Signal analysis system 21 is adapted to perform time correlated analysis of the neutron detector signals to permit discrimination against the X-ray pulses and against continuous background noise. This is accomplished by well known box-car integration techniques which can be implemented by dedicated electronic components or by software programming of digital processors in accordance with procedures well known in the art.

To selectively detect Be contamination in the subsurface soil, a photoneutron response $N_1$ is first measured for X-ray photon pulses with a maximum energy at least 100 keV below the 1.665 MeV photoneutron threshold. This gives a response level representing soil components other than Be. Then a photoneutron response $N_2$ for X-ray photon pulses with maximum energy at least 100 keV above the Be photoneutron threshold is measured. The magnitude of the difference $N_2$-$N_1$ is representative of the amount of Be present in the soil.

Alternative Embodiments

Referring to FIG. 1, the diameter of cylindrical housing 11 is necessarily large enough to include the apparatus contained within. Because commercially available X-ray systems occupy a minimum diameter greater than about 8 inches, the diameter of housing 11 and any bore hole in which the apparatus is placed must also exceed about 8 inches. This limitation can be alleviated by miniaturization of commercially available apparatus by using shorter wavelength microwaves or by other approaches.

Figure 2:
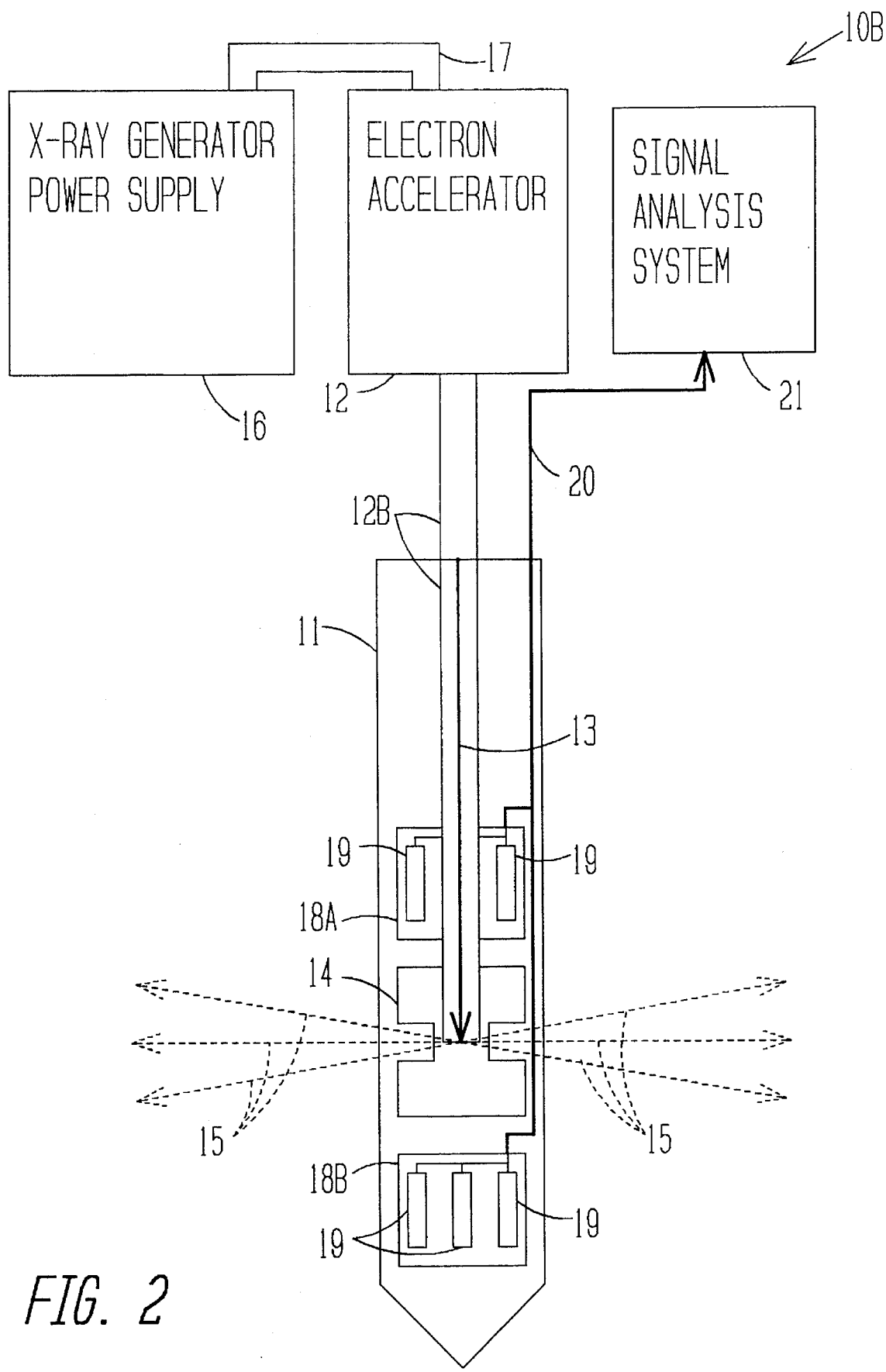
FIG. 2 illustrates a photoneutron detection system in accordance with a second embodiment the inventive concept.

Another method for reducing the diameter of the portions of the apparatus which are inserted below the soil surface is illustrated in reference to FIG. 2. A photoneutron detection apparatus 10B shown in FIG. 2 differs from photoneutron detection apparatus 10A shown in FIG. 1 in the following particulars:

Referring to FIG. 2, electron accelerator 12 is positioned outside cylindrical housing 11 (shown in cross-section) and above the soil surface. High energy electrons 13 are propagated through an elongated propagation tube 12B (shown in cross-section within housing 1) before reaching target 14 (shown in cross-section) which can be placed below the soil surface as before. The advantage of this approach is that the components inside housing 11 can be made much smaller than presently available electron accelerator 12, and hence the diameter of housing 11 can be made significantly smaller so as to penetrate into a smaller bore hole. However, the propagation path for high energy electrons 13 cannot be allowed to bend.

Many modifications and variations of the present invention are possible in light of the above teachings. It is therefore to be understood that within the scope of the appended claims, the invention may be practiced otherwise than as specifically described.

What is claimed is:

1. A photoneutron detection apparatus for detecting selected contaminants in subsurface soil comprising:

a housing configured to be disposed in proximity to said subsurface soil;

a generator disposed in said housing for generating X-ray photons having selected energies to irradiate said subsurface soil with timed pulses of said X-ray photons;

a detector disposed in said housing for detecting photoneutrons emitted from said subsurface soil in response to said X-ray photons and for generating signals representative of neutron flux of said photoneutrons; and a signal analyzer for receiving said signals and for time correlating said signals corresponding to said selected energies with said timed pulses to determine the presence of said selected contaminants in said subsurface soil.

2. The photoneutron detection apparatus of claim 1 wherein said selected energies range from 1 to 7 MeV.

3. The photoneutron detection apparatus of claim 1 wherein said timed pulses have pulse durations of less than 5 microseconds.

4. The photoneutron detection apparatus of claim 1 wherein said detector detects fast neutrons.

5. The photoneutron detection apparatus of claim 4 wherein said detector detects slow neutrons.

6. The photoneutron detection apparatus of claim 1 wherein said detector detects slow neutrons.

7. The photoneutron detection apparatus of claim 1 wherein said selected contaminants include beryllium and fissionable nuclear isotopes.

8. The photoneutron detection apparatus of claim 1, further comprising a target collimator operably coupled to said generator for directing said X-ray photons away from said photoneutron detection apparatus and into said subsurface soil.

9. A method for detecting selected contaminants in subsurface soil by photoneutron emission comprising the steps of:

irradiating said subsurface soil with timed pulses of X-ray photons having selected energies;

detecting photoneutrons produced in said subsurface soil in response to said X-ray photons and generating signals representative of neutron flux of said photoneutrons;

receiving said signals; and time correlating said signals corresponding to said selected energies with said toned pulses to determine the presence of said selected contaminants in said subsurface soil.

10. The method of claim 9 wherein said selected energies range from 1 to 7 MeV.

11. The method of claim 9 wherein said timed pulses have a pulse duration of less than 5 microseconds.

12. The method of claim 9 wherein the step of detecting photoneutrons includes detecting fast neutrons.

13. The method of claim 12 wherein the step of detecting photoneutrons includes detecting slow neutrons.

14. The method of claim 9 wherein the step of detecting photoneutrons includes detecting slow neutrons.

15. The method of claim 9 wherein the step of analyzing said signals includes calculating a neutron flux difference representative of the amount of a selected contaminant present in said subsurface soil.

16. The method of claim 15 wherein said selected contaminant is chosen from the group including beryllium and fissionable nuclear isotopes.

17. The method of claim 9 wherein said selected contaminants include beryllium and fissionable nuclear isotopes.

18. The method of claim 9, further including the step of collimating said X-ray photons to confine said X-ray photons substantially to said subsurface soil.

\* \* \* \* \*